Oct. 28, 1958     K. C. ALLEN ET AL     2,858,124
SCALES
Filed June 14, 1954
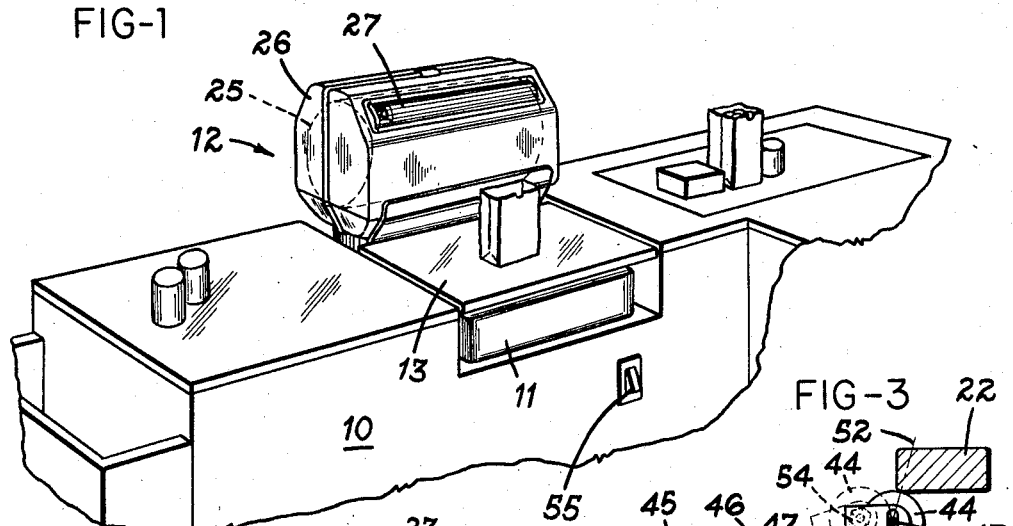
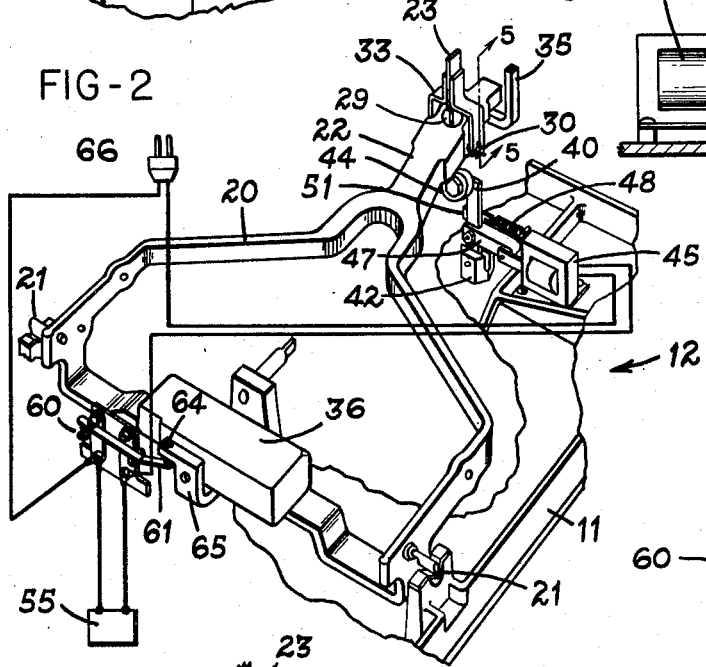
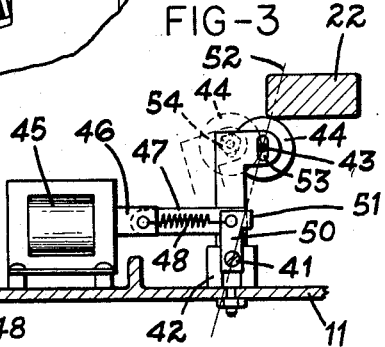
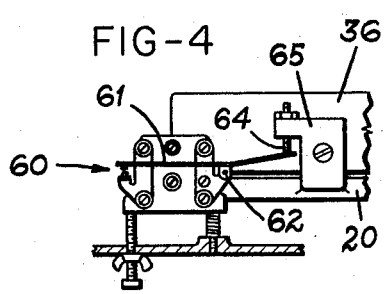
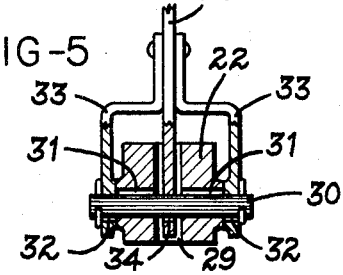
*INVENTORS*
KENNETH C. ALLEN &
BY    DAVID A. MEEKER
*ATTORNEYS*

United States Patent Office 2,858,124
Patented Oct. 28, 1958

2,858,124

SCALES

Kenneth C. Allen, Dayton, and David A. Meeker, Troy, Ohio, assignors to The Hobart Manufacturing Company, Troy, Ohio, a corporation of Ohio Application June 14, 1954, Serial No. 436,297

8 Claims. (Cl. 265—27)

This invention relates to weighing scales.

The invention has special relation to a scale adapted for use in conjunction with a cashier's checkout counter for provisions and the like having the platter of the scale arranged in interfitting relation with the counter so that the goods being checked out pass across the platter in their path along the counter. In such installations, the scale is ordinarily used for weighing only a portion of the total volume of goods, such for example as bulk vegetables or fruits in a food market where the major number of items comprise packaged or canned goods not requiring weighing. It is apparent, therefore, that if such scale operates with all of the goods passing across its platter, the weighing mechanism will be subjected to correspondingly unnecessary and relatively severe wear.

It is a primary object of the present invention to provide a scale capable of installation with its platter interfitting with a check-out counter as outlined above which incorporates simple and effective controls for selectively causing operation or non-operation of the weighing mechanism of the scale depending upon whether or not the particular goods on the platter require weighing, and thereby to protect the weighing mechanism against unnecessary and possible relatively rough use.

An additional object of the invention is to provide such a scale wherein the weighing mechanism is normally blocked against weighing movement and wherein separate actuation of a control is required for each desired weighing operation in order to assure maximum protection for the weighing mechanism by minimizing the possibility of unintentional operation of the scale as well as deliberate or careless neglect by the operator of safety controls for the scale.

Another object is to provide such a scale wherein the weighing mechanism is normally blocked against operation, wherein a control must be actuated by the operator to permit movement of the weighing mechanism for a weighing operation, wherein such weighing movement retains the control in inoperative position for the duration of the weighing operation, and wherein return of the weighing mechanism to its zero position causes the control to return to its operative position blocking further weighing movement of the weighing mechanism.

It is also an object of the invention to provide such a scale wherein special provision is made for minimizing the transmission of shock to the chart of weights and computed values of the scale as the result of application to the platter of goods not requiring weighing while the weighing mechanism is blocked against weighing movement.

A further object of the invention is to provide a scale as outlined above wherein the stopped position of the weighing mechanism is at substantially the zero position of the scale but not precisely at such zero position in order to permit sufficient movement of the weighing mechanism in its blocked position to demonstrate that the scale is in balance, and a still further object of the invention is to provide such a scale wherein there is a lost motion connection between the weighing mechanism and the chart of weights and computed values for the purpose of minimizing the transmission of shocks therebetween.

Additional objects and advantages of the invention will be apparent from the following description, the accompanying drawings and the appended claims.

In the drawings:

Fig. 1 is a perspective view illustrating an installation in accordance with the invention of a scale in a cashier's check-out counter;

Fig. 2 is a somewhat diagrammatic perspective view illustrating the weighing mechanism of the scale together with the controls of the present invention;

Fig. 3 is a fragmentary showing on a larger scale of the construction and operation of the stop assembly for the weighing mechanism;

Fig. 4 is a fragmentary view showing one of the switches in the control circuit for the stop assembly; and Fig. 5 is a fragmentary section on the line 5—5 of Fig. 2 showing the lost motion connection between the weighing lever and the chart of weights and computed values.

Referring to the drawing, which illustrates a preferred embodiment of the invention, Fig. 1 illustrates diagrammatically at 10 a portion of a check-out counter such as may be used by the cashier in a food market or the like. This counter is recessed at an intermediate location thereon to receive the base 11 of a scale indicated generally at 12 and including a platter 13. In Fig. 1, the goods passing along the counter are intended to move from right to left in the drawing, and the parts are so arranged that in the zero position of the scale, the surface of the platter 13 will be slightly below the top of the counter to the right thereof, for example ⅛ inch, and slightly above the level of the counter to the left thereof, for example ⅜ inch. Thus as the cashier moves the goods along the counter, they will move readily on and off the platter toward the discharge end of the counter for packaging.

The scale 12 is illustrated as generally of the construction shown in Meeker et al. Patent No. 2,649,293, issued August 18, 1953 to the assignee of this application. The weighing mechanism which supports the platter 13 includes a lever 20 pivoted at 21 on the base 11 and terminating in a rearwardly extending arm 22 which carries the nose iron. The arm 22 is connected with the rack 23 which operates the drum chart 25 of weights and computed values in the upper portion 26 of the scale, the figures on the chart being visible to the clerk or cashier through the window 27 at the front of the housing portion 26 and to the customer through a similar window at the back of the scale. The lower end of rack 23 extends into a recess 29 in lever arm 22, and the connection between the arm 22 and the rack is formed by a pin 30 extending through a bore 31 in the arm 22 and through aligned bores 32 in the two forked arms 33 secured to the rack and straddling the arm 22 as shown in Figs. 2 and 5. The lower end of rack 23 also has a bore 34 therethrough receiving pin 30, but this bore is of substantially greater diameter than the pin to prevent possible binding while enabling the rack to reinforce the bracket arms 33 against permanent deformation.

In the operation of this scale, when a load is applied to the platter 13, the lever 20 will pivot so that the arm 22 pulls the rack 23 downwardly and thus rotates the drum chart 25 in accordance with the weight of the goods on the platter. The part 35 shown fragmentarily in Fig. 2 is a portion of the arm connecting the lever arm 22 with the counterbalancing spring in the upper part of the housing as shown in the above noted patent, and the part 36 at the front of the lever is the zero adjustment weight.

In order to protect the weighing mechanism by preventing operation of the scale when the goods passing across the platter do not require weighing, a movable stop is provided in the base which normally limits the weighing movements of the lever and is selectively movable out of the path of the lever. This stop includes an arm 40 pivoted on a bolt 41 in a bracket 42 mounted on the base, and the arm 40 carries at its upper end a roller 44 on a shouldered pivot bolt 43. The movement of the stop arm 40 is controlled by a solenoid 45, which is mounted on the base 11 and has its armature 46 connected by a link 47 with the arm 40. A spring 48 is connected between the armature 46 and a clip 50 fixed on the bracket 42 by the pivot bolt 41 for arm 40.

The stop arm 40 and its roller 44 are located in predetermined relation to the lever arm 22 such that when the solenoid 45 is deenergized, the arm 40 will be biased by spring 48 to a position in which the roller 44 will limit downward movement of the lever. The clip 50 includes an extension portion 51 which acts as a stop limiting movement of arm 40 toward the lever under the biasing force of the spring, and the parts are so positioned that this operative limit position of arm 40 is just enough past the dead center vertical position of the arm to provide an over-center action such that the weight of a load on the lever will act to hold arm 40 in this position rather than to move the arm against the spring. In addition, this position of the arm is so determined that the edge of the lever arm 22 will rest on the roller 44 at a position which is just to the left as viewed in Fig. 3 of the line 52 connecting the centers of the pivot bolts 41 and 43, but which is below the top of the roller. This arrangement facilitates movement of the stop arm and roller away from their operative position by the solenoid 45 even in the presence of a load on the platter, since such movement is effected with minimum lifting of the lever by the solenoid.

The stop assembly also incorporates means for adjusting the stop roller 44 vertically in order to establish the position of the weighing mechanism at which the stop unit is effective in its operative position. Such blocked position of the weighing mechanism should be substantially the zero position of the scale but not precisely such zero position, since the laws with respect to weights and measures commonly require that a scale be capable of sufficient floating movement past its zero position to demonstrate that the scale is in balance when no load is on the platter. Fig. 3 accordingly shows an adjustable mounting for the roller provided by a vertically arranged slot 53 in the arm 40 for the pivot bolt 43, and this bolt is accordingly provided with a lock nut 54.

When the scale 12 is to be used for a weighing operation, the solenoid 45 is energized to retract the stop arm 40 and roller 44 against the biasing force of spring 48. The energizing circuit for the solenoid is accordingly shown as including a switch 55 mounted as indicated in Fig. 1 in a position for convenient actuation by the operator, and this switch is of the normally open type such as a push button switch requiring that it be manually held to close the circuit therethrough. Thus when the goods on the platter 13 require weighing, it is only necessary for the operator to close switch 55 momentarily, which will effect retraction of the stop arm and roller 44 to a sufficient distance past center to permit downward movement of the lever arm 22 beyond the roller 42, which movement will be substantially instantaneous.

In order to prevent interference between the stop roller 44 and the lever after the weighing operation is in progress, means are provided for maintaining energizing of the solenoid 45 until the weighing operation is completed. Fig. 2 shows a switch 60 which is mounted in the front of the base 11 and may be of the type commonly provided in such scales for illuminating the chart as soon as a weighing operation begins. As shown in detail in Fig. 4, the switch arm 61 for the switch 60 is pivoted at 62 and is held open in the zero position of the scale by a stud 64 carried by a portion 65 on the opposite side of fulcrum pivots 21 from the lever arm 22. Thus as soon as the lever pivots during a weighing operation, the stud 64 will lift sufficiently to permit the switch arm 61 to close the circuit through switch 60, and this switch is shown as connected in parallel with the actuating switch 55 and provided with a connecting plug 66 for connection to a receptacle.

With this arrangement of switches as shown, actuation of the switch 55 with a load on the platter permits the weighing operation to begin by depression of the platter and lever, causing switch 60 to close and thereby to establish a holding circuit for the solenoid 45. The operator may accordingly immediately release switch 55. As soon as the weighing operation is completed and the weighing mechanism has returned to its zero position, the switch 60 will open. Since the operator will already have released the manual switch 55, this discontinues the energizing circuit for solenoid 45 and thus effects return of the stop arm 40 and roller 44 to their operative position shown in full lines in Fig. 3.

As noted, the operative position of the stop arm 40 is preferably such that the weighing mechanism is blocked at substantially but not precisely the zero position of the scale, in order to meet the weights and measures regulations noted above. However, if the stop arrangement is therefore such that the scale weighing mechanism can move through an adequate small distance to meet such regulations, for example one to two ounces, then the repeated sudden applications to the platter of loads of goods which do not require weighing will cause corresponding pounding of the weighing mechanism against the stop. This will tend to transmit objectionable shock to the drum chart 25 and its actuating mechanism, with resulting tendency to oscillation of the chart.

The present invention prevents such undesirable results by the provision of a shock absorbing connection between the weighing mechanism and the chart. Referring particularly to Fig. 5, it has been found in accordance with the invention that undesirable shock effects on the chart are prevented by providing sufficient clearance for the pivot pin 30 to form a lost motion connection between the lever and chart. For example, satisfactory results from this standpoint have been obtained in a thirty-pound scale of the illustrated type by employing a pin 30 approximately .005 inch less in diameter than the bores 31 and 32, providing a total of approximately .010 inch lost motion between the lever and rack, which corresponds to about three ounces on a thirty-pound scale.

In operation with this construction, the lever is normally held in its zero position by the counterbalancing springs (not shown), and a weighing movement of the weighing mechanism will cause the lever arm 22 to move downwardly about the pivots 21 as shown in detail in the above noted Patent No. 2,649,293. When the lever is stationary, gravity will cause the rack 23 and arms 33 to descend as far as permitted by the clearances provided at 31 and 32, and Fig. 5 thus shows the relation of these parts in the zero position of the scale.

When a load is placed on the platter with the stop roller 44 positioned to block the lever after movement thereof corresponding to a total load of between 1 and 2 ounces as pointed out above, the resulting movement of the lever will be less than the total lost motion provided by the clearances 31 and 32 as described. Therefore, there is no tendency for the lever to transmit any pulling force to the rack 23, and the rack will merely be free to follow the lever arm 22 under the influence of gravity until the parts again assume the relative positions shown in Fig. 5. The result will therefore be to cause only relatively slow rotation of the chart and minimized tendency to stress its supporting and operating parts. Furthermore, when the rack does come to rest, it is not tightly held to the lever, and thus if there is any bouncing or oscillating, the rack can again move upwardly relative to the lever. This action tends to dampen out very quickly any tendency for the chart to oscillate. It will of course be apparent that with the lever thus capable of limited movement from its precise zero position, the stud 64 should be adjusted to maintain switch 60 open until the lever has moved beyond its blocked position.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a scale of the character described having a base, a weighing mechanism and a platter adapted for mounting in conjunction with a check-out counter with said platter in the path of goods along said counter, the combination of means for controlling said scale to provide selectively for protection of said scale by preventing operation thereof during passage across said platter of goods not requiring weighing, comprising a stop for said weighing mechanism, means supporting said stop on said base for movement between an operative position blocking said weighing mechanism from operation at substantially the zero position thereof and a retracted position releasing said weighing mechanism for normal weighing movement, means normally maintaining said stop in said operative position, means requiring actuation by the operator for selectively causing retraction of said stop from said operative position to provide for a weighing operation of said scale, and means responsive to return of said weighing mechanism to said zero position thereof for automatically returning said stop to said operative position thereof.

2. In a scale of the character described having a weighing mechanism and a platter adapted for mounting in conjunction with a check-out counter with said platter in the path of goods along said counter, the combination of means for controlling said scale to provide selectively for normal operation of said scale to weigh goods requiring weighing and for protected non-operation of said scale during passage across said platter of goods not requiring weighing, comprising a stop for said weighing mechanism, means supporting said stop for movement between an operative position blocking said weighing mechanism from operation and a retracted position releasing said weighing mechanism for normal weighing movement, means normally maintaining said stop in said blocking position, actuating means under the control of the operator for selectively retracting said stop from said blocking position to provide for a weighing operation of said scale, and means responsive to movement of said weighing mechanism resulting from a load on the platter for retaining said stop in said retracted position thereof until completion of said weighing operation and thereafter for automatically effecting return of said stop to said blocking position to require operation by the operator of said actuating means for each weighing operation.

3. In a scale of the character described having a base, a weighing mechanism and a platter adapted for mounting in conjunction with a check-out counter with said platter in the path of goods along said counter, the combination of means for controlling said scale to provide selectively for protection of said scale by preventing operation thereof during passage across said platter of goods not requiring weighing, comprising a stop for said weighing mechanism, means supporting said stop on said base for movement between an operative position blocking said weighing mechanism at substantially the zero position thereof and a retracted position releasing said weighing mechanism, means normally maintaining said stop in said blocking position, electric means for retracting said stop from said blocking position, switch means under the control of the operator for actuating said electric means to provide for weighing operation of said scale, and additional switch means responsive to movement of said weighing mechanism from said zero position thereof for maintaining actuation of said electric means until return of said weighing mechanism to said zero position following completion of said weighing operation, said additional switch means being responsive to return of said weighing mechanism to said zero position thereof to discontinue actuation of said electric means for return of said stop to said blocking position thereof.

4. In a scale of the character described having a platter supported on the base thereof by a weighing mechanism including a lever pivoted for weighing movement in the base and adapted for mounting in conjunction with a check-out counter with said platter in the path of goods along said counter, the combination of means for controlling said scale to provide selectively for protection of said scale by preventing operation of said weighing mechanism during passage across said platter of goods not requiring weighing, comprising a stop for said weighing mechanism, means supporting said stop on said base for movement between a retracted position releasing said lever for normal weighing movement and an operative position blocking said lever at substantially the zero position of said weighing mechanism, means normally maintaining said stop in said blocking position, actuating means requiring operation by the operator for selectively causing retraction of said stop from said blocking position to provide for a normal weighing operation of said scale, and means responsive to return of said lever to said zero position for automatically returning said stop to said blocking position thereof to require operation of said actuating means for each weighing operation of said scale.

5. In a scale of the character described having a base, a weighing mechanism and a platter adapted for mounting in conjunction with a check-out counter with said platter in the path of goods along said counter, the combination of means for controlling said scale to provide selectively for operation of said scale to weigh goods requiring weighing and for non-operation of said scale during passage across said platter of goods not requiring weighing, comprising a lever forming a part of said weighing mechanism and mounted for downward movement in response to the application of a load to said platter, a stop arm pivoted on said base for movement between a blocking position located in the path of said lever from the zero position thereof and a retracted position, a roller pivoted on said arm and adapted for direct engagement by the edge of said lever in said blocking position of said arm at a location on said roller between the top of said roller and the point thereon traversed by a line connecting the pivots of said roller and said arm, means normally maintaining said stop arm in said blocking position, means requiring actuation by the operator for selectively causing retraction of said arm from said blocking position to provide for a weighing operation of said scale, and means responsive to return of said lever to said zero position for automatically returning said arm to said blocking position.

6. In a scale of the character described having a base, a weighing mechanism and a platter adapted for mounting in conjunction with a check-out counter with said platter in the path of goods along said counter, the combination of means for controlling said scale to provide selectively for protection of said scale by preventing operation thereof during passage across said platter of goods not requiring weighing, comprising a lever forming a part of said weighing mechanism and mounted for downward movement in response to the application of a load to said platter, a stop arm pivoted on said base for movement between an operative position located in the path of said lever from the zero position thereof and a retracted position, a roller pivoted on said arm and adapted for direct engagement by the edge of said lever in said operative position of said arm at a location on said roller between the top of said roller and the point thereon traversed by a line connecting the pivots of said roller and said arm, means for effecting vertical adjustment of said roller in said operative position of said arm to establish the position of said weighing mechanism in which said roller is effective to stop said lever, means normally maintaining said stop arm in said operative position, means requiring actuation by the operator for selectively causing retraction of said arm from said operative position to provide for a weighing operation of said scale, and means responsive to return of said lever to said zero position for automatically returning said arm to said blocking position.

7. In a scale of the character described adapted for mounting in conjunction with a check-out counter with the platter thereof in the path of goods along said counter and including a weighing mechanism and a movable chart of weights and computed values, the combination of means for controlling said scale to provide selectively for protection of said scale by preventing operation thereof during passage across said platter of goods not requiring weighing, comprising a stop for said weighing mechanism, means supporting said stop on said base for movement between a retracted position releasing said weighing mechanism for weighing movement and an operative position blocking said weighing mechanism at a position spaced by a predetermined small amount from a zero position of said weighing mechanism to provide for demonstrating that said scale is in balance, means normally maintaining said stop in said blocking position, means forming a lost motion connection between said weighing mechanism and said chart to minimize shock to said chart resulting from movement of said mechanism from said zero position to said blocked position thereof caused by passage across said platter of goods not requiring weighing, means under the control of the operator for causing retraction of said stop from said blocking position to provide for a weighing operation of said scale, and means responsive to return of said weighing mechanism to said zero position thereof for returning said stop to said blocking position thereof.

8. In a scale of the character described adapted for mounting in conjunction with a check-out counter with the platter thereof in the path of goods along said counter and including a weighing mechanism and a movable chart of weights and computed values, the combination of means for controlling said scale to provide selectively for protection of said scale by preventing operation thereof during passage across said platter of goods not requiring weighing, comprising a stop for said weighing mechanism, means supporting said stop on said base for movement between a retracted position releasing said weighing mechanism for weighing movement and an operative position blocking said weighing mechanism at a position spaced by a predetermined small amount from the zero position of said weighing mechanism to provide for demonstrating that said scale is in balance, means normally maintaining said stop in said blocking position, means forming a lost motion connection between said weighing mechanism and said chart to minimize shock to said chart resulting from movement of said mechanism from said zero position to said blocked position thereof caused by passage across said platter of goods not requiring weighing, electric means for causing retraction of said stop from said blocking position, switch means under the control of the operator for actuating said electric means to provide for a weighing operation of said scale, and additional switch means responsive to movement of said weighing mechanism from said blocked position thereof for maintaining actuation of said electric means and responsive to return of said weighing mechanism to said zero position thereof to discontinue actuation of said electric means for return of said stop to said blocking position thereof.

References Cited in the file of this patent

UNITED STATES PATENTS

| | | |
|---|---|---|
| 673,261 | Hazen | Apr. 30, 1901 |
| 1,231,952 | Sewall | July 3, 1917 |
| 1,667,893 | Hem | May 1, 1928 |
| 1,754,064 | Sykes et al. | Apr. 8, 1930 |
| 1,893,622 | Howard | Jan. 10, 1933 |
| 2,263,383 | Griffith | Nov. 18, 1941 |
| 2,579,602 | Niederer et al. | Dec. 25, 1951 |